Oct. 6, 1953  H. L. JAMES  2,654,567
PIPE PULLER
Filed April 27, 1950  2 Sheets-Sheet 1
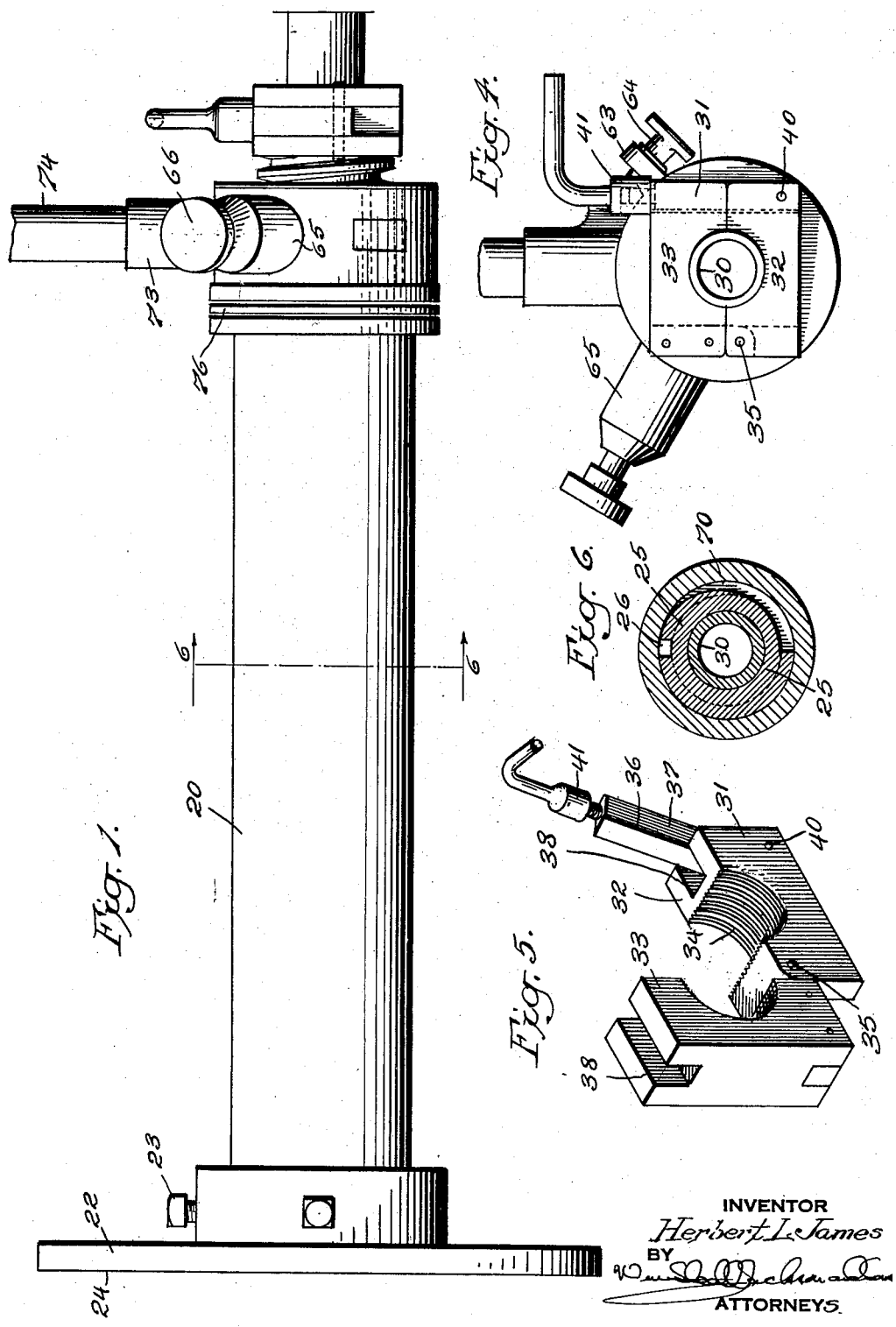
INVENTOR
Herbert L. James
BY
ATTORNEYS Oct. 6, 1953          H. L. JAMES          2,654,567
PIPE PULLER
Filed April 27, 1950          2 Sheets—Sheet 2
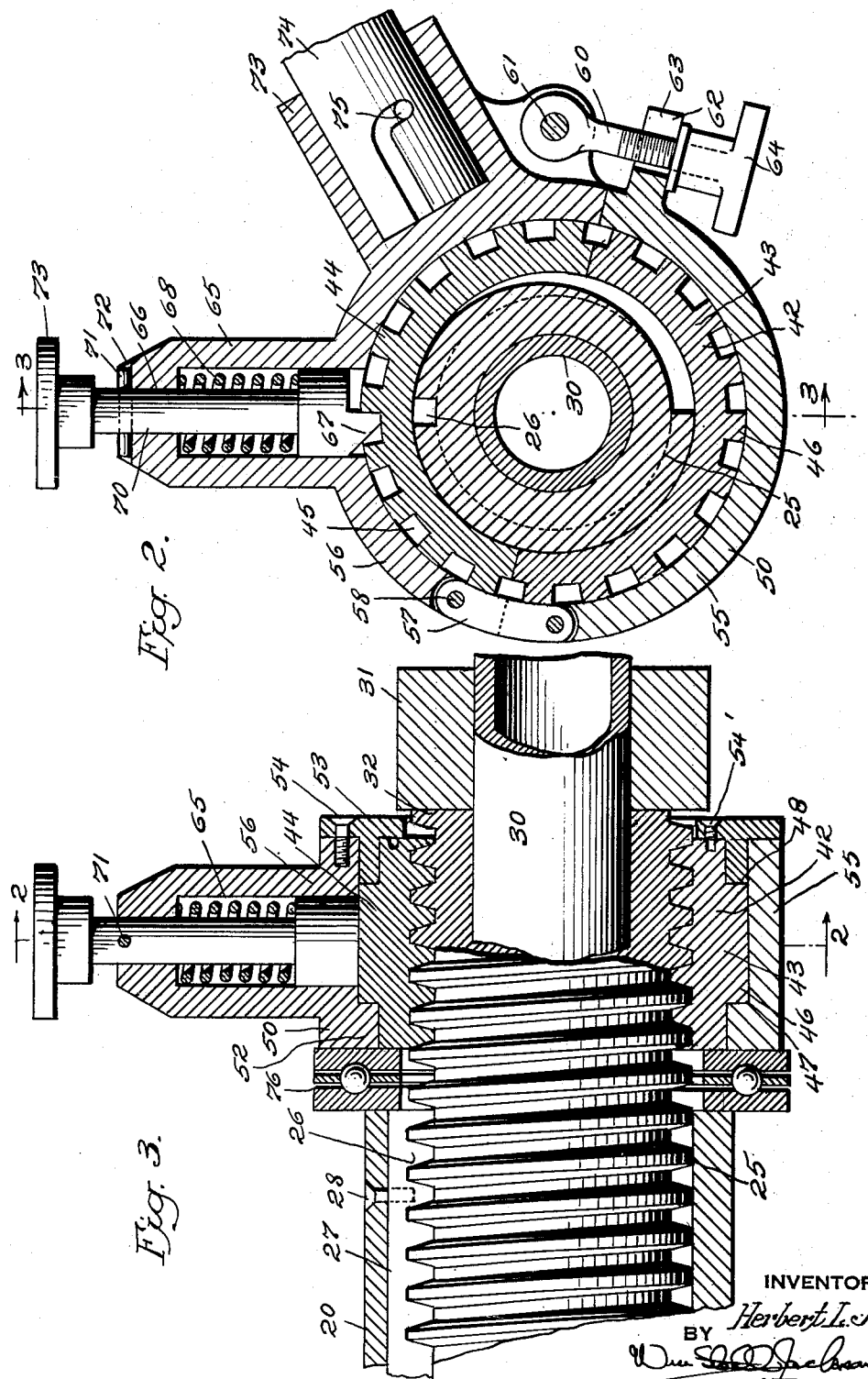
INVENTOR
*Herbert L. James*
BY
ATTORNEYS Patented Oct. 6, 1953

2,654,567

UNITED STATES PATENT OFFICE 2,654,567

PIPE PULLER

Herbert L. James, Philadelphia, Pa.

Application April 27, 1950, Serial No. 158,397

1 Claim. (Cl. 254—30)

The present invention relates to pipe pullers of the type which are adapted to move pipes longitudinally for forcing the same through the ground or into or out of positions in walls or buildings.

A purpose of the invention is to obtain more positive and reliable forcing action on a pipe.

A further purpose is to permit the pulling of a pipe by the action of a nut cooperating with a screw around the pipe and acting against a clamp on the pipe.

A further purpose is to interpose a thrust bearing between the pipe puller housing and the nut.

A further purpose is to hold the screw against turning by a key in the pipe puller housing.

A further purpose is to obtain ratchet action from a handle on the nut.

A further purpose is to split the nut and the ratchet casing so as to permit removal to another position on the screw.

Further purposes appear in the specification and in the claim.

In the drawings I have chosen to illustrate one only of the numerous embodiments in which my invention may appear, selecting the form shown from the standpoints of convenience in illustration, satisfactory operation and clear demonstration of the principles involved.

Figure 1 is a side elevation of a pipe puller embodying my invention, with the handle and pipe broken.

Figure 2 is an enlarged section of my pipe puller on the line 2—2 of Figure 3.

Figure 3 is an enlarged section of my pipe puller on the line 3—3 of Figure 2.

Figure 4 is a front end elevation of the pipe puller of the invention.

Figure 5 is a perspective showing the clamp in open position.

Figure 6 is a section on the line 6—6 of Figure 1.

Describing in illustration but not in limitation and referring to the drawings:

It is sometimes the practice to force pipes such as water and gas pipes and electrical conduits through the ground as for example under a front lawn, porch or sidewalk, and under roads, and also to pull pipes into and out of position in buildings and walls. Many prior art pullers involve chains or other hoisting mechanism which is difficult to manipulate, does not evenly distribute the load on the pipe, and is likely to cause bending or breakage.

By the present invention pressure is applied longitudinally of the pipe through a screw surrounding the pipe acted on by a nut, against a clamp, and the speed and convenience of operation are aided by making the nut adjustable along the length of the screw by separating the parts of the nut. The nut is turned by a ratchet and the load axially on the nut is transmitted to the housing by a thrust bearing.

The components of the device can very desirably be made of steel.

A tubular housing 20 carries at one end a flange 22 which is secured as by set screw 23. The flange at its base surface 24 is desirably supported against a wall or temporary support to bar the load of the puller.

A tubular screw 25 inside the housing has a longitudinal slot 26 which receives a key 27 secured to the inside of the housing as by screws 28 (Figure 3). A pipe 30 being pulled extends through the hollow interior of the screw and is engaged at the outside by a clamp 31 which is contacted by the end 32 of the screw remote from the flange 22.

The clamp 31 desirably consists of two jaws 32 and 33 each having serrated semi-cylindrical internal pipe engaging faces 34, hinged together at 35 and interconnected by a clamping screw device 36. The clamping screw device consists of a bar 37 extending through a slot 38 in the end of each jaw remote from the hinge 35, hinged to the jaw 32 at 40 and making threaded connection at the opposite end from the hinge 40 to a turn screw 41 which engages the jaw 33 at the end of its slot 38 toward the outside of the clamp.

A split nut 42 having halves 43 and 44 is internally threaded to cooperate with the threads on the outside of screw 25. The nut is located between clamp 31 and the end of the housing 20. The nut has, around its outside circumference, ratchet teeth 45 which are desirably formed in a rim 46 extending out radially beyond the rest of the nut to form opposite shoulders 47 and 48.

A ratchet casing 50 surrounds the split nut and has at the side remote from the clamp an inwardly extending flange 52 which engages behind the shoulder 47. At the opposite side of the split nut a split retaining ring 53 engages behind shoulder 48 and is held in place by retaining screw 54 extending into the casing. Screws 54' through the retaining ring engage a groove on the end of the nut, and tend to prevent separation of parts. The ratchet casing is made of two halves 55 and 56 which are hinged by a link 57 making pivotal connection with the two halves of the casing through pins 58. At the opposite side of the split casing it is held together by a holding screw 60 which is swingably connected to ratchet casing portion 56 by a pin 61 and which extends through a slot 62 in lug 63 on ratchet casing portion 55. The nut 64 on the screw beyond the lug tightens the casing halves together.

The casing has a ratchet chamber 65 extending radially from it in line with the ratchet teeth, and guiding a ratchet dog 66 which has a dog tooth 67 sloping in one direction and straight in the other direction at the end, extending into an individual one of the ratchet teeth. The ratchet dog is spring urged by a compression spring 68 toward engaging position. On the stem 70 of the dog an aligning pin 71 is provided near the outer end fitting in an aligning notch 72. A handle 73 is provided to permit withdrawing the ratchet dog beyond the tooth which it engages and reversing the ratchet.

The ratchet casing has a handle socket 73 which receives a handle 74 and makes a bayonet joint 75 with the handle to hold it in place.

A thrust bearing 76 suitably of ball thrust type is interposed between the ratchet nut and casing on the one hand, and the adjoining end of the housing.

In operation the flange 22 is positioned against the wall or other support, the split nut and ratchet casing are separated and the split nut is fitted over the screw near the beginning of the thread as shown in Figure 3. The split nut is then tightened in place by tightening ratchet casing screw 60. The ratchet is turned so that it will engage in the proper direction to pull the pipe in the direction desired. The pipe is then carried through the interior of the screw and if necessary can extend beyond the flange 22. The clamp is tightened about the pipe adjoining the end 32 of the screw.

The user then turns the nut with respect to the screw, the screw moving longitudinally but not turning as it is retained by the key. As the nut is turned, it brings pressure through the thrust bearing on the housing, on the flange and on the support. The screw thus advances to the right in Figures 1 and 3, forcing the pipe in this direction. When the screw has moved to the limit of its thread, the user can open the ratchet housing and separate the parts of the nut, push the screw longitudinally toward the left in Figures 1 and 3 until it reaches a position similar to that shown in Figure 3, and again tighten the nut and ratchet casing around the screw. The clamp is then loosened and moved toward the left in Figures 1 and 3 until it again engages the forward end 32 of the screw. The clamp is again tightened. The puller is then ready for further operation to pull the pipe toward the right.

This series of steps can be repeated indefinitely as desired.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a pipe puller, a hollow housing, a tubular screw extending through the housing and beyond the housing, the screw having a longitudinal keyway, a key in the interior of the housing engaging in the keyway in the screw and preventing the screw from turning, a clamp engaging the end of the screw and adapted to grip the pipe, a split nut surrounding the screw and having ratchet teeth on its outside, pivot means interconnecting the split nut at one side, a clamp interconnecting the split nut at the other side and ratchet turning means engaging the ratchet teeth.

HERBERT L. JAMES.

References Cited in the file of this patent

UNITED STATES PATENTS

| Number | Name | Date |
|---|---|---|
| 1,654,011 | Osanni | Dec. 27, 1927 |
| 1,916,466 | Eckleo | July 4, 1933 |
| 1,938,601 | Mason | Dec. 12, 1933 |
| 1,982,835 | Stanpfli et al. | Dec. 4, 1934 |
| 1,999,174 | Jackson | Apr. 30, 1935 |

FOREIGN PATENTS

| Number | Country | Date |
|---|---|---|
| 13,855 | Great Britain | of 1905 |